United States Patent [19]

McGoughy

[11] Patent Number: 4,726,177
[45] Date of Patent: Feb. 23, 1988

[54] SAFETY APPARATUS FOR CONNECTING GRASS COLLECTOR TO LAWN MOWER DISCHARGE CHUTE

[75] Inventor: Elliott McGoughy, Memphis, Tenn.

[73] Assignee: Outboard Marine Corporation, Waukegan, Ill.

[21] Appl. No.: 903,649

[22] Filed: Sep. 5, 1986

[51] Int. Cl.⁴ .............................................. A01D 34/70
[52] U.S. Cl. ........................................ 56/202; 56/16.6
[58] Field of Search ................... 56/202, 16.6, 320.2, 56/320.1

[56] References Cited

U.S. PATENT DOCUMENTS

| | | | |
|---|---|---|---|
| 3,186,152 | 6/1965 | Epstein | 56/202 |
| 3,423,918 | 1/1969 | Siwek | 56/202 |
| 3,561,201 | 2/1971 | Dahl | 56/202 |
| 3,636,686 | 1/1972 | Meyer et al. | 56/320.2 |
| 3,820,313 | 6/1974 | Hoffman | 56/202 |
| 3,928,956 | 12/1975 | Boyer | 56/202 |
| 4,031,694 | 6/1977 | Gobin | 56/202 |
| 4,203,276 | 5/1980 | Plamper | 56/202 |
| 4,214,424 | 7/1980 | Gobin | 56/202 |
| 4,238,918 | 12/1980 | Saruhashi et al. | 56/202 |
| 4,244,160 | 1/1981 | Carolan | 56/202 |
| 4,312,176 | 1/1982 | Bollinger et al. | 56/202 |

Primary Examiner—John Weiss
Attorney, Agent, or Firm—Albert L. Free

[57] ABSTRACT

Apparatus for connecting a grass collector to the discharge chute of a power lawn mower. A lower front portion of a ring around the receiving mouth of the collector is hooked over a detent at the bottom side of the chute and pivoted upwardly until an upper portion of the ring rests in a nest formed by a pair of upper tabs and a lower tab extending outwardly from a pivoted safety door. The door is biased toward a closed position across the discharge opening of the chute, and is opened by a hook extending from an over-center latch, between the upper tabs. The hook extends around the nested upper portion of the ring, and when the latch is manually operated to its closed position the hook pulls against the ring portion to move it and the upper part of the door forwardly. This clamps the collector mouth to the chute, at the same time opening the safety door. The collector cannot be removed until the safety door has been returned to its closed position by manually operating the latch to its open position.

10 Claims, 8 Drawing Figures

SAFETY APPARATUS FOR CONNECTING GRASS COLLECTOR TO LAWN MOWER DISCHARGE CHUTE

BACKGROUND OF THE INVENTION

In motorized lawn mowers of the type in which a whirling blade moving in a plane parallel to the ground is used to cut the grass, the cut grass and incidental debris such as pieces of sticks or stones are in effect sucked up by the whirling blade and discharged through a discharge opening to the exterior. When it is desired to collect the cuttings and debris, a collector such as a fabric bag or the like is commonly secured to the discharge opening of the discharge chute, so that the grass and debris enter the mouth of the collector and are collected for subsequent disposal by removing and emptying the bag from time to time.

Particularly in the case in which the collector is positioned behind the motor and blade so that the discharge chute is directed rearwardly toward the operator, if no precautions are taken dangerous high-velocity discharge of debris toward the operator can occur, with possible injury to him, if the mower motor is operated in the absence of the collector. When the collector is in place, this cannot occur since the collector intercepts and contains such flying debris before it can reach the operator. However, such injury can occur if the collector is intentionally or accidentally removed and the mower motor continues to operate.

To avoid such dangerous condition, a safety bar is often provided on the mower frame, adjacent the operator's main handle, which is spring-biased in a direction to shut off the motor automatically. The operator must hold the safety bar against the handle in order to use the mower, and as soon as he releases the safety bar, for example to remove the bag, the motor stops. However, with some constructions the bag may accidentally disconnect from the chute while the motor is running, or the operator may defeat the purpose of the safety bar by tying it to the main handle. For such reasons it is also common to provide a guard plate pivotably urged by spring tension and/or gravity into a closed position in which it extends across at least most of the discharge opening when the collector is absent, but is pivoted upwardly out of the way, to an open position, when the collector is in place.

A large variety of such apparatuses have been proposed. In some of them, a lever is manually actuated to pivot the guard plate out of the way before the collector is attached; in others, the pushing of the collector onto the chute mounting arrangement itself causes the guard plate to open, inside the collector.

While some of these arrangements have been useful for their intended purposes, they have generally been less than ideal in one or more respects. For example, they may be complex and difficult to operate, or unreliable in assuring that the guard plate will be in its closed position whenever the collector is disconnected, and in some cases they may not provide for clamping the mouth of the collector to the discharge chute as snugly and securely as is desired.

Accordingly, it is an object of the invention to provide a new and useful structure for connecting a collector to the discharge chute of a lawn mower.

Another object is to provide such apparatus which assures that the guard plate will be in its closed position whenever the collector is disconnected from the discharge chute.

A further object is to provide such apparatus which also assures that the mouth of the collector will be snugly and stably coupled to the discharge opening of the discharge chute.

A still further object is to provide such apparatus which is relatively inexpensive and simple to make, as well as easy to use.

SUMMARY OF THE INVENTION

These and other objects of the invention are achieved by the provision of apparatus in which a first portion of the guard plate, extending on one side of the pivot axis of the guard plate, is provided with a nesting structure facing the collector to receive a mounting portion of a ring member secured to and encompassing the mouth of the collector, so that this mounting portion can be placed and held in the nesting structure when the collector is first being assembled to the discharge chute; the guard plate is continuously biased toward its closed position, but is movable to its open position by a manually-operable latching means on the chute having a hook member which in its extended position hooks itself around the mounting portion of the ring as it lies in the nesting structure. When it is manually retracted by operation of the latching means, the hook member pulls against the far side of the ring mounting portion to clamp the nested mounting ring against the outside of the discharge chute, while at the same time causing the guard plate to pivot to its open position in response to the pulling of the hook member on the mounting portion of the ring. When the latching means is later manually released, to permit removal of the collector, the hook member releases its grip on the ring and permits the guard plate automatically to return to its closed position.

Not only is the collector ring thereby clamped tightly and securely to the discharge chute, and the guard plate pivoted to its open position, all in the same motion of the latching mechanism during securing of the collector to the chute, but in addition the latch means is rendered ineffective to open the guard plate unless the collector is secured to the chute, since the hook means relies upon engaging the mounting portion of the mounting ring in order to exert a force on the top portion of the guard plate and move it to its open position; this cannot happen when the ring is not in the nesting position at the time the hook of the latch means is moved to its retracted position. In addition, the collector cannot be disconnected until the guard plate has pivoted back into its closed position.

Accordingly, a mechanism of simple form and easy operation is provided which when operated in one direction not only serves to assure a snug fit between the mouth of the collector bag and the chute, but simultaneously automatically opens the guard plate, while assuring that when the collector is disengaged from the discharge chute the guard plate will be closed.

BRIEF DESCRIPTION OF FIGURES

These and other objects and features of the invention will be more readily understood from a consideration of the following detailed description, taken in connection with the accompanying drawings, in which.

DETAILED DESCRIPTION OF SPECIFIC EMBODIMENTS

Figure 1:
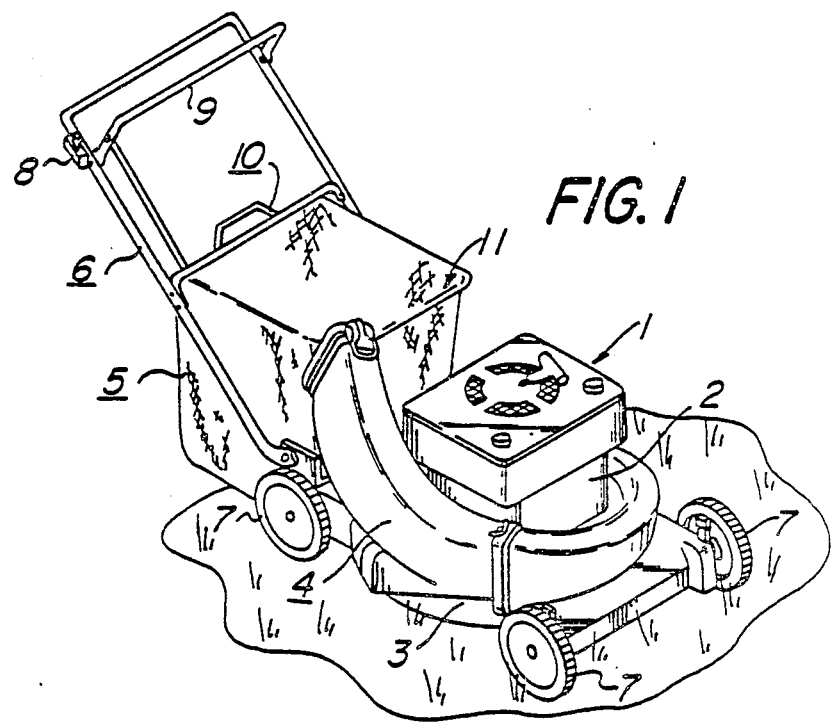
FIG. 1 is a perspective view of a power lawn mower embodying the invention.

Referring to FIG. 1, a power lawn mower 1 is shown having as its basic components a motor 2 connected to the usual rotary blade (not shown) within the housing 3, a grass discharge chute 4, a collector in the form of a grass-catching bag 5, handling frame 6, and a set of four wheels 7. The lawn mower may have various convenience and safety features such as a power throttle 8 and a power shut-off safety bar 9 which are connected by electrical wires and circuits (not shown) to control the operation of the motor 2.

During normal use of the lawn mower 1, cut grass and other debris are ejected from the chute 4 into the grass-catching bag 5. The bag 5 is easily detachable from the lawn mower 1 to empty it, by detaching the rear support sling 10 from the handling frame 6 and detaching the support rod 11 from the chute 4. The latter support rod is in the form of a steel rod through the neck and across the top of the collector bag and secured thereto.

It is desirable that the operation of detaching and replacing the bag be simple and quick, since the operator may need to empty the bag several times if he is mowing a large lawn. In the type of lawn mower shown herein, sometimes called a rear-bagging mower, the discharge end of the chute is directed toward the rear of the lawn mower 1 where the operator of the machine typically stands, so the machine should obviously not be operated without an attached bag 5 to catch the ejected debris, and the bag 5 should not be detached when motor 2 is on. If someone should attempt to improperly operate a lawn mower 1 without an attached bag 5, and without the guard plate described hereinafter, there is a clear danger that hard materials, such as pieces of stone or twig unavoidably picked up with the grass clippings, will be ejected from chute 4 and will strike the operator or a bystander.

In order to reduce the danger referred to above, the lawn mower 1 is conventionally provided with the safety bar 9 which automatically shuts off the motor 2 whenever the operator is not holding it against the top handle portion of frame 6; this intentionally makes it awkward for an operator to attempt to keep the power on while he is removing or replacing the grass-catching bag 5, and the motor will therefore normally turn itself off at such times. However, in some known constructions the bag may inadvertently disengage itself from the chute, and in some cases an operator may defeat the safety bar, as by tying it to the main mower handle.

In accordance with the present invention, an additional safety feature of novel form and operation is introduced which assures that the chute opening 13 will be closed off to prevent ejection of debris whenever the bag 5 is not fully latched to chute 4. As better shown in enlarged perspective in FIG. 2, lawn mower chute 4 is provided with a guard plate 12 which is pivotally mounted on a mounting bracket 14 on the top side of chute 4 by pivot means including a pivot pin 15, which is inserted through the holes 16, 17 in guard plate 12 and bracket 14, respectively. Mounting bracket 14 is attached to chute 4, in this preferred embodiment by bolting it to a bottom plate 18 inside the chute using bolts such as the bolt shown at 19 in FIG. 4.

Figure 2:
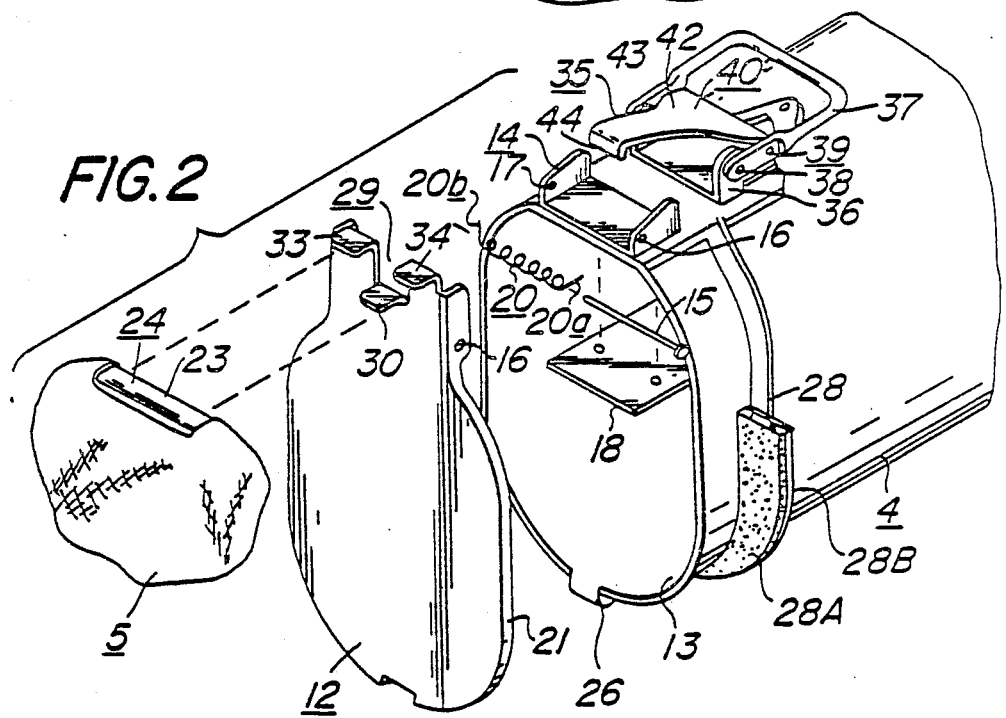
FIG. 2 is a perspective, exploded view, on an enlarged scale as compared to FIG. 1, of the end of the lawn mower chute of FIG. 1 and showing various components of the invention.
Figure 3:
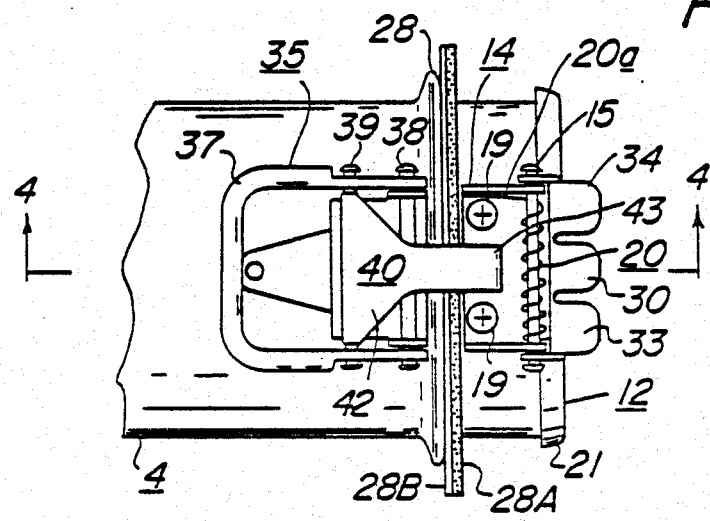
FIG. 3 is a plan view, on an enlarged scale as compared to FIG. 1, of the mounting and latch mechanism for the lawn mower bag.
Figure 4:
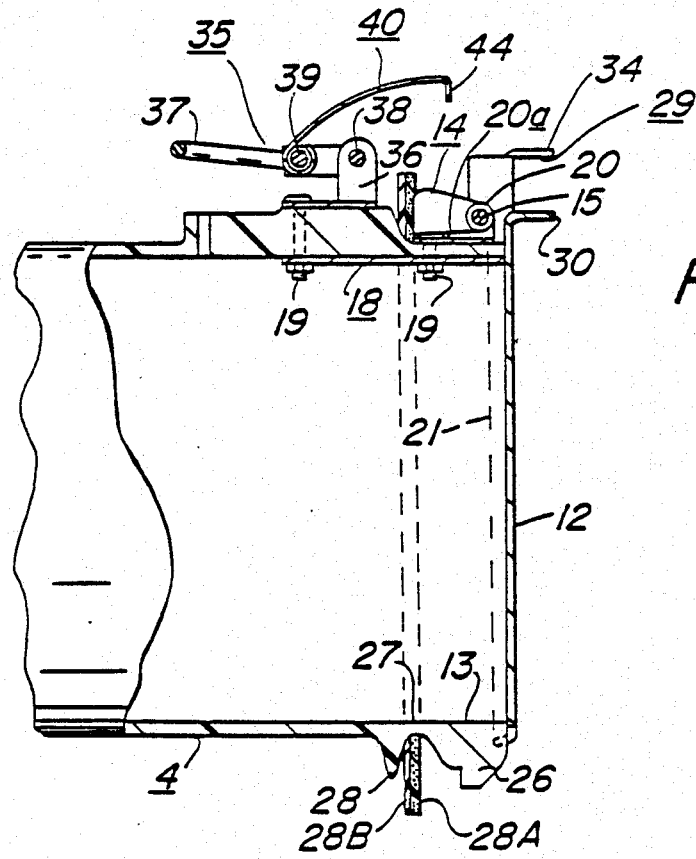
FIG. 4 is a side elevational section taken along the line 4—4 of FIG. 3.

Referring now to FIGS. 2, 3 and 4, a helical spring 20 is provided, wrapped around the pivoting pin 15, resiliently to urge guard plate 12 towards the closed position at all times. To provide this action, end tang 20A of spring 20 bears downwardly against the bottom of bracket 14, and the other end tang 20B bears outwardly against the upper portion of guard plate 12, whereby the lower portion of plate 12 is urged inwardly in the opposite sense, to cover discharge chute opening 13. Thus, in the closed position, guard plate 12 substantially completely covers the chute opening 13 to prevent the undesirable ejection of grass clippings and hard debris from chute 4. The apparatus therefore provides for automatic movement of guard plate 12 to its closed position, covering chute opening 13, and the guard plate 12 must be manipulated in a particular positive manner to pivot it away from its natural closed position and into its open position, as will be described.

Guard plate 12 preferably has a flanged edge 21 to give added stiffness, and the flanged edge 21 preferably has a shape conforming to the cross-section of chute 4, to provide a good fit over the outside of the end of the chute.

Figure 8:
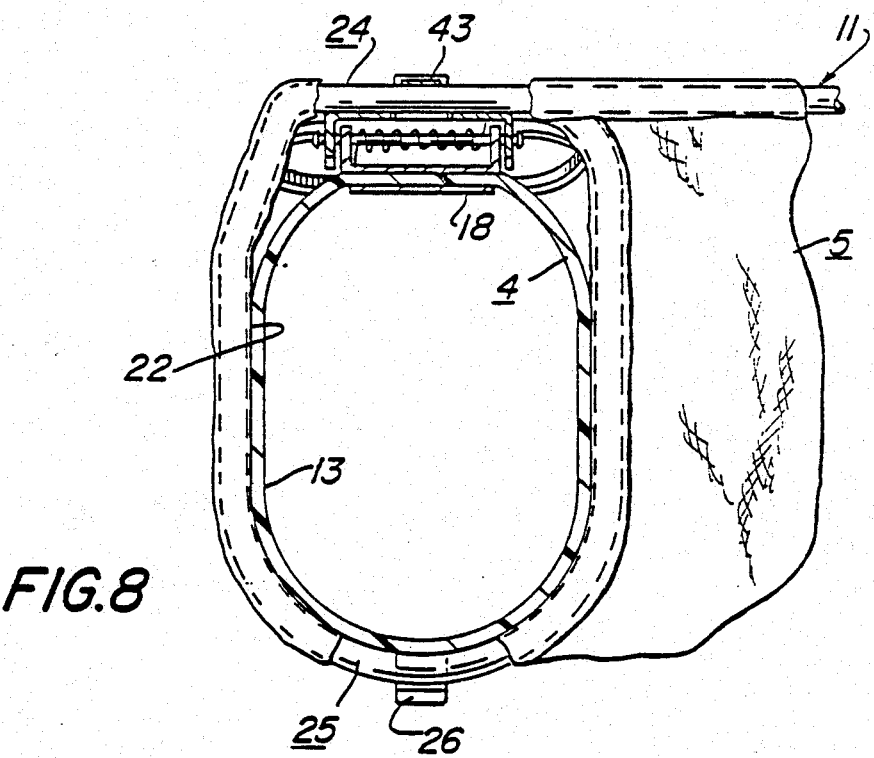
FIG. 8 is an end sectional view, looking into the grass-catching bag from within the chute of FIG. 6, taken along the line 8—8 of FIG. 6.

Also conforming to the cross-sectional shape of chute opening 13 is the receiving mouth 22 of the grass-catching bag 5, as better shown in FIG. 8. As mentioned previously, grass-catching bag 5 is supported on lawn mower 1 partly by the support rod 11. This support rod 11 is preferably made of steel rod which encompasses the mouth of the collector through which debris is delivered to the collector from the discharge chute.

The grass-catching bag 5 in this example employs woven channels in the region of the receiving mouth 22, to receive the bag support rod 11. Receiving mouth 22 preferably has a first exposed mounting portion 24 and a second exposed mounting portion 25, at its top and bottom respectively, where the fabric of bag 5 is cut away to expose the bag support rod 11 beneath the fabric for purposes to be explained below. As can be best seen in FIG. 8, the receiving mouth 22 is dimensioned to fit snugly over the chute 4 with the first exposed mounting portion 24 approximately at the top of chute 4, and the second exposed mounting portion 25 located circumferentially opposite thereof, i.e. at the bottom of the chute.

Referring now to FIGS. 2-5, the exposed mounting portions 24, 25 are adapted for connection to the chute 4 at the above-mentioned two circumferentially opposite positions. To this end, the bottom of chute 4 is provided with a radially projecting ear 26, and a circumferential ridge 28 extends along the sides and bottom of the chute a short distance back from the chute opening 13. The region between the ear 26 and the ridge 28 constitutes a detent 27 for receiving and holding the second mounting portion 25 of support rod 11.

Preferably, a foam collar 28A secured to a rigid backing plate 28B extends around the chute just forward of the ridge 28, against which the receiving mouth 22 is pressed when fully installed, to provide a more secure air seal preventing grass clippings from being blown out of the chute-to-grass bag interface. This collar is installed on the chute prior to mounting of the latching mechanism thereon.

In addition, in accordance with the invention a nesting structure 29 is provided on the part of guard plate 12 which extends above the axis of the pivot pin 15. In this example it comprises a lower projecting ear 30 and two upper projecting ears 33, 34 spaced apart from each other across the guard plate. The ear 30 and the pair of ears 33, 34 are vertically spaced apart sufficiently to accommodate the placement of the first mounting portion 24 of the grass-catching bag 5 horizontally therebetween, as shown for example in FIG. 5.

Figure 5:
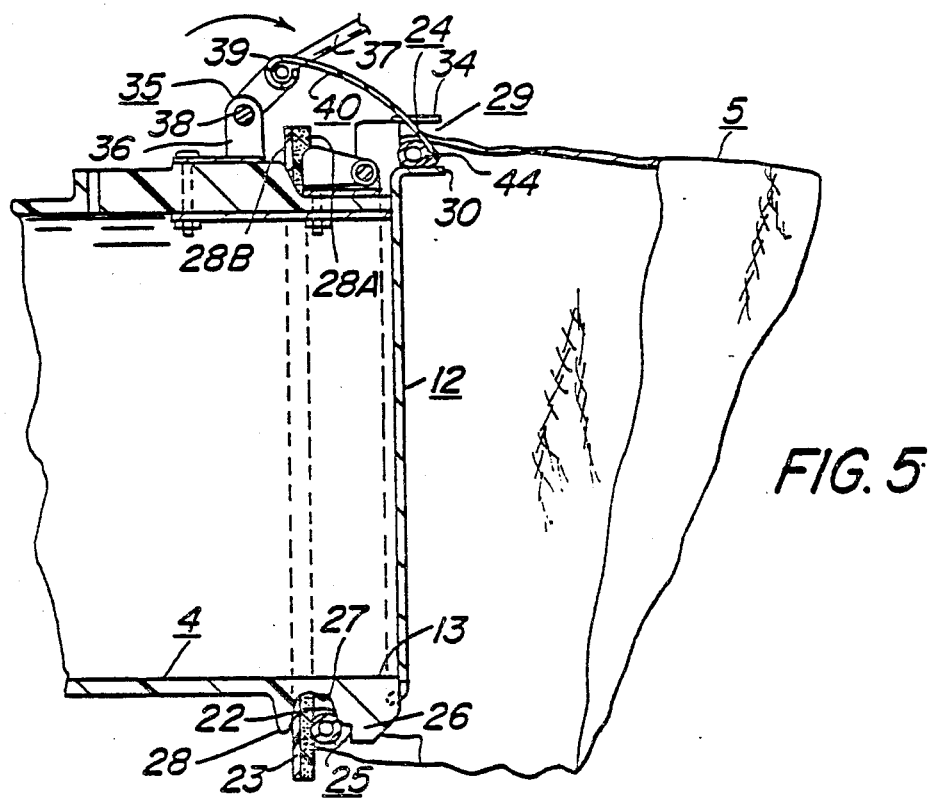
FIG. 5 is a side elevational section similar to FIG. 4, but showing a portion of a grass-catching bag preliminarily mounted on the lawn mower chute and with the hook means of the invention extended to engage the frame of the bag.

It can be readily seen from the above that the bag mouth 22 can be connected to the chute 4 by first hooking the second exposed mounting portion 25 over projecting ear 26 and into the detent 27 formed between ear 26 and foam collar 28A,28B, and then pivotting the mouth 22 of the bag upwardly to place the first exposed mounting portion 24 in the nesting structure defined by the lower ear 30 and upper ears 33, 34, as shown in FIG. 5. This mounting of the grass-catching bag 5 on chute 4 constitutes the only way in which the bag receiving mouth 22 can be connected to the chute 4, so that the operator is forced to make the proper connection.

Once the exposed mounting portions 24, 25 of the bag receiving mouth 22 have been placed in the positions described above, the bag is ready to be latched to the chute. To permit this, in accordance with the invention latching means comprising an over-center-action latch 35 are provided on chute 4 behind the mounting bracket 14 and bolted to the bottom plate 18 inside chute 4. This general class of latch is well-known in the art, although the particular configuration and dimensions of latch 35 differ in certain significant respects from those previously known.

The over-center-action latch 35 includes a mounting bracket 36 and a U-shaped lever 37 which is pivotally connected at the pivot points 38 to mounting bracket 36. A pivot pin 39 is attached to and extends between the opposite sides of the U-shaped lever 37, and a hook 40 is pivotally secured thereto. Hook 40 is preferably made of a resilient material such as a spring steel plate, or some other strong and spring material, and is preferably slightly convex upwardly as shown, so that when stretched longitudinally it will extend itself and become more flat but will tend to return to its original curved shape when released.

Hook 40 is constructed in a shape which makes it especially effective for the purposes of the present invention. At its point of pivotal connection, the hook 40 is sufficiently wide that it is wrapped around substantially the entire length of pivot pin 39, to make a firm and strong connection, as is shown in FIG. 3. The hook 40 has a tapered portion 42 adjacent the wrapped end 41, which flows into a narrow arm portion 43, and which in turn is connected to a hook portion 44 (see FIG. 4). As will be seen from the Figures, the arm 43 is sufficiently narrow to fit between ears 33 and 34 on the guard plate.

Figure 6:
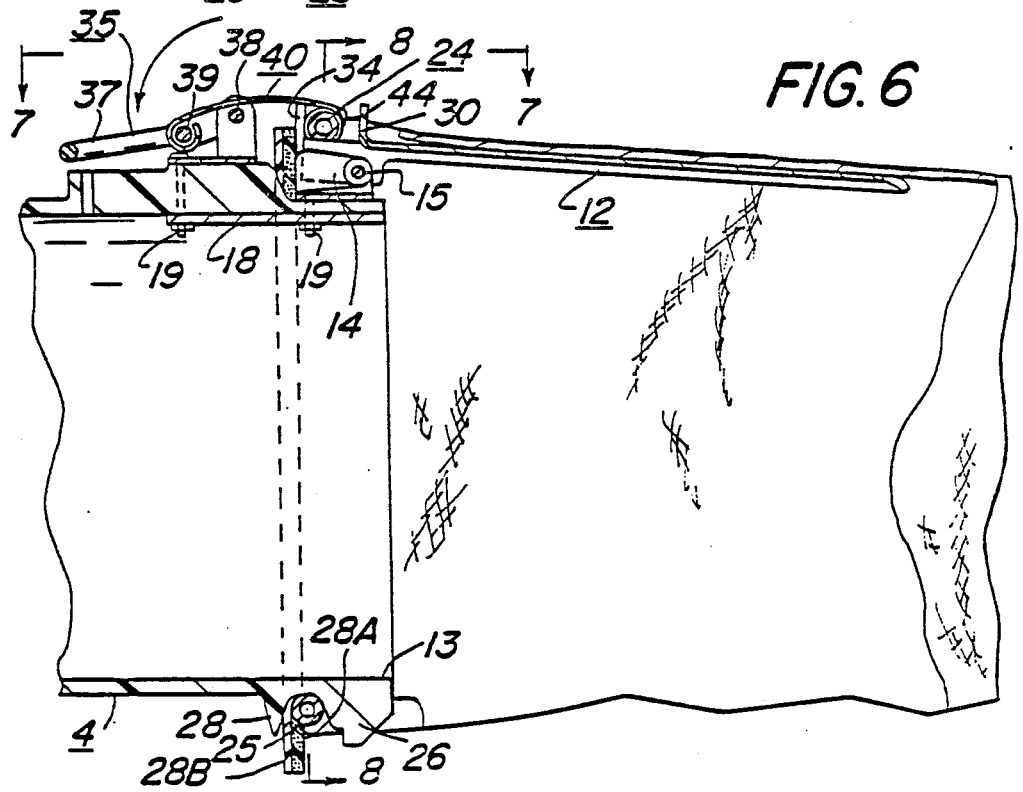
FIG. 6 is a side elevational section similar to FIG. 5, but with the hook in latched position and the guard plate in open position within the bag.
Figure 7:
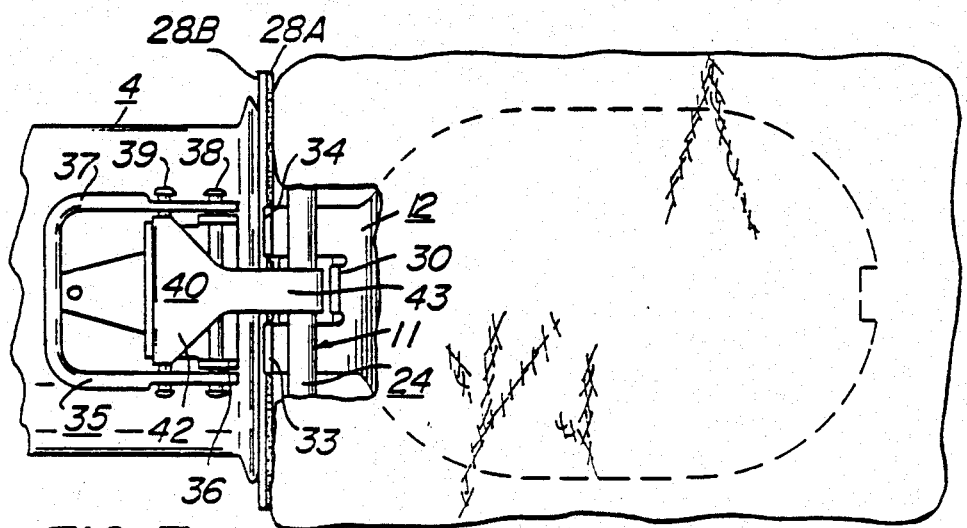
FIG. 7 is a plan view, taken as indicated by the line 7—7 of FIG. 6, showing the bag attached and locked in position, with the guard plate in open position within the bag.

Latch 35, mounting bracket 14 and guard plate 12 are configured such that hook 40 can reach through the space between parallel ears 33, 34 and hook around and against the far side of the first mounting portion 24 nested within the nesting structure 29, as shown in FIG. 5. Lever 37 can then be pivoted to its extreme position away from the nesting structure 29, i.e. to the latched position shown in FIG. 6, wherein hook 40 is in its fully retracted position. Since the guard plate 12 is pivoted about the pivoting pin 15, the above latching motion causes hook 40 to pull the first mounting portion 24 and the top of guard plate 12 toward chute 4, thus to pivot the plate to its open position within the grass-catching bag 5, as is also shown in FIG. 6. Also, in the latched position of the latch 35, the ring 11 around the mouth 22 of grass-catching bag 5 is pulled toward and clamped firmly and stably against foam collar 28A, 28B on chute 4, so that any grass clippings or other debris issuing out of discharge chute 4 will be captured within bag 5, without risk of injury to the operator or bystanders.

The latch 35 is called an over-center-action latch because, as seen for example from FIG. 6, the latching action requires that pivot pin 39 move from one side to the other of an imaginary plane passing through both the pivot point 38 of lever 37 and the mounting portion 24 of ring 11. Thus, while during initial retraction of the hook 40 the resistance of the guard plate and bag tends to pull the lever 37 clockwise in FIG. 6, in the fully latched condition the resistance of plate and bag tends to pull lever 37 counterclockwise as viewed in FIG. 6, and to move pivot point 39 downwardly against the base of mounting bracket 36. This holds the latch 35 firmly in its "latched" condition, until the latch is manually released by operating lever 37 over-center in the clockwise direction. The curved shape of the hook arm, and its spring characteristics, enables it to flatten and extend itself sufficiently to permit the lever 37 to pass over-center, while still providing tension in the hook arm when it is in its fully-latched condition, thereby to hold the guard plate fully elevated and the bag tightly secured to the chute.

It is noted that when it is desired to detach the grass-catching bag 5, the operator must unlatch the over-center-action latch 35 before he can detach receiving mouth 22 from chute 4. Once the latch 35 is released, guard plate 12 will automatically close, due to the resilient urging of spring 20, before the operator is able to remove the first and second mounting portions 24, 25 of the receiving mouth 22 from the nesting structure. Thus it is not possible to detach bag receiving mouth 22 from chute 4 before the guard plate 12 has been closed.

Also, only after the exposed mounting portions 24, 25 of ring 11 have been placed within the nesting structure 27, 29 can the hook 40 be used to latch receiving mouth 22 in place. This is because hook 40 can only be made to latch onto the first mounting portion 24, and is not directly attachable to guard plate 12 in the absence of the mounting portion 24. By insuring that the latching mechanism operates only with the bag mouth structure properly positioned for latching, an operator is prevented from operating the lawn mower with guard plate 12 held open, unless the bag 5 is properly attached to capture the discharged debris.

While the invention has been described with particular reference to specific embodiments thereof in the interest of complete definiteness, it may be embodied in a variety of forms diverse from those specifically shown and described, without departing from the spirit and scope of the invention.

What is claimed is:

1. In a lawn-mower assembly comprising a lawn-mower discharge chute, a collector having a mouth for receiving and collecting grass and debris discharged from said chute, means for removeably securing said collector to a discharge end of said chute so that the discharge end of said chute is aligned with said mouth of said collector, a guard plate and pivot means pivotally mounting said guard plate on said discharge end of said chute to enable pivotting of said plate between an open position in which said discharge opening communicates freely with said mouth of said collector and a closed position in which said guard plate substantially covers said discharge opening, plate biasing means for urging said plate toward said closed position, and plate actuating means for pivotting said guard plate from said closed position to said open position when said collector is secured to said discharge end of said chute, the improvement wherein:

said collector comprises a ring member secured to said collector on the side of said collector normally facing said discharge end of said chute, encompassing said mouth of said collector and adapted to fit around said discharge end of said chute, said ring member having at least first and second mounting portions circumferentially spaced from each other and adapted to be secured to said discharge end of said chute;

said guard plate comprises a first part extending on one side of the pivot axis of said pivot means and a second part extending on the other side of said pivot axis, whereby moving said first part of said plate toward said chute moves said plate toward said open position;

said first part of said guard plate is configured to define a nesting structure above said pivot axis and on the side of said plate facing away from said chute end, whereby said first mounting portion of said ring member may be placed and held in said nesting structure when said collector is advanced to said discharge end of said chute; and manually-operable latching means secured to said chute adjacent said first part of said guard plate and comprising hook means operable to an extended position in which it is hooked loosely around said first mounting portion of said ring member as it lies in said nesting structure, and operable to a retracted position to pull against the far side of said first mounting portion and clamp said ring member to the outside of said discharge chute, at the same time causing said guard plate to pivot to said open position thereof.

2. The apparatus of claim 1, comprising a detent on said chute adjacent said discharge opening and positioned to mate with said second mounting portion of said ring member, whereby said second mounting portion may be advanced into said detent and said ring member thereafter pivoted to move said first portion of said ring member into said nesting structure while said second mounting portion remains in said detent.

3. The apparatus of claim 2, wherein said first and second mounting portions are at the top and bottom of said ring member respectively, said pivot axis is horizontal, and said latch means are secured to the top of said chute.

4. The apparatus of claim 1, wherein said nesting structure comprises three ears extending at right angles from said first part of said plate, a pair of said ears being aligned with each other across the width of said plate and the other ear being spaced therefrom toward said pivot axis to receive said first mounting portion of said ring member between said pair of ears and said one ear, said pair of ears serving to retain said first mounting portion when said latching means is in its latched condition.

5. The apparatus of claim 4, wherein said guard plate is provided with a cut-out between the ears of said pair to accommodate passage of said hook member from one side of said guard plate to the other.

6. The apparatus of claim 1, wherein said latching means comprises an over-center latch.

7. The apparatus of claim 1, comprising abutment means extending along the exterior of said chute means adjacent said discharge opening to form a seat for said ring when said latching means is operated to its retracted position.

8. The apparatus of claim 1, wherein said latching means comprises an over-center-latch having a lever arm shaped like a U with a pivot pin extending from one arm to the other of said U, said hook means being pivotally mounted on said pin.

9. The apparatus of claim 1, wherein said hook means comprises a spring-metal plate, having a convex-upward shape along the direction of its length.

10. Apparatus for releasably attaching a grass collector to the discharge end of the discharge chute of a power lawn mower and, as said collector is attached, operating to an open position a pivoted guard plate which is normally springbiased to a closed position in which it extends across the discharge opening of said chute, comprising:

manually-operable latching means mounted on said chute near its discharge end, and comprising a pivotably-mounted hook member which is extensible, by manual operation of said latching means to its unlatched condition, to hook itself around a portion of said collector when said collector has been aligned with said chute end and placed against a outer side of said guard plate while said guard plate is in its closed position;

the axis of pivot of said guard plate being below said hook member, and said guard plate having a part extending above said axis;

said hook member, said collector portion and said guard plate being configured and arranged so that upon manual operation of said latching means to its latched condition, said hook member pulls said portion of said collector against said part of said plate, thereby to pivot said guard plate to its open position while at the same time securely clamping said collector to said chute.

* * * * *